Apr. 24, 1923. 1,453,059
C. J. BLASS
COUPLING
Filed Aug. 4, 1919 2 Sheets-Sheet 1
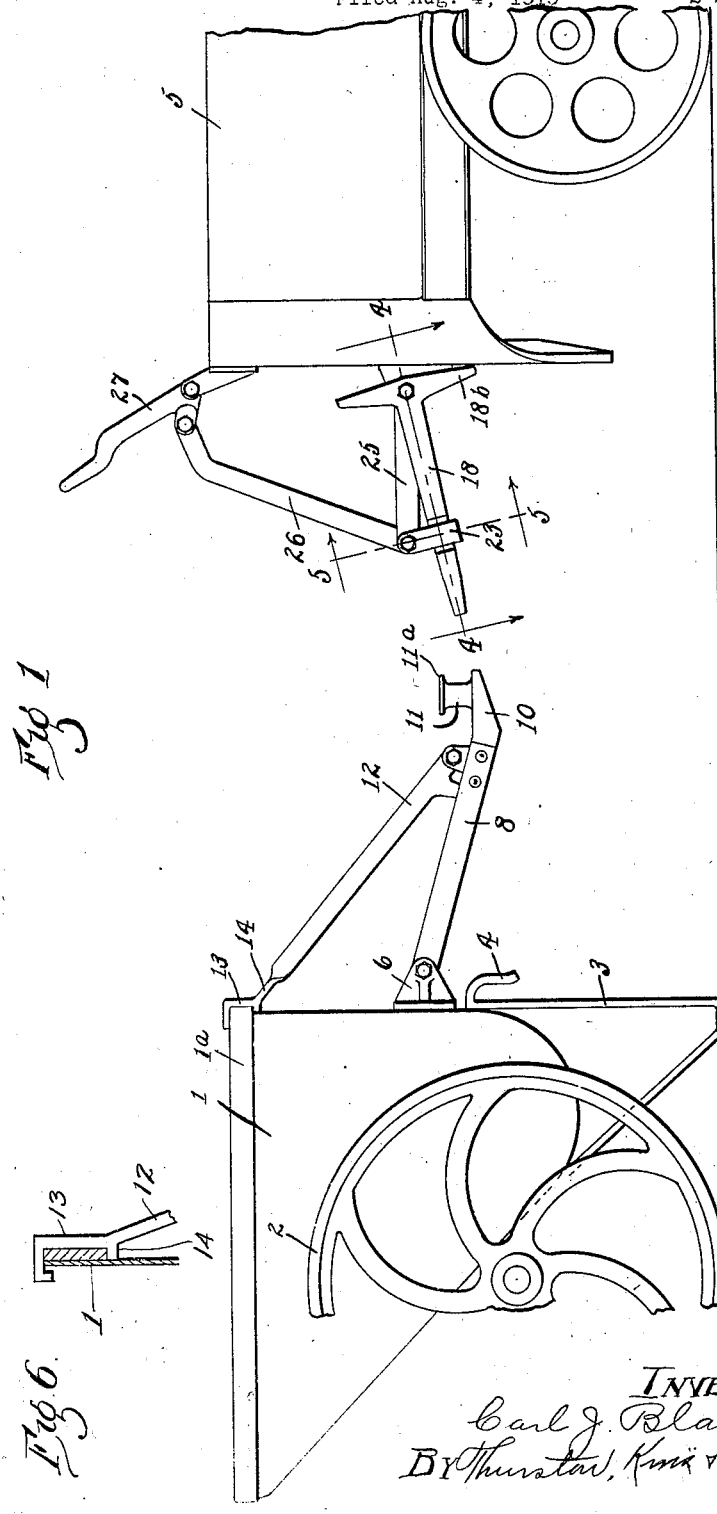
INVENTOR
Carl J. Blass
BY Thurston, Kwis & Hudson
ATTYS Apr. 24, 1923.
C. J. BLASS
COUPLING
Filed Aug. 4, 1919
1,453,059
2 Sheets-Sheet 2
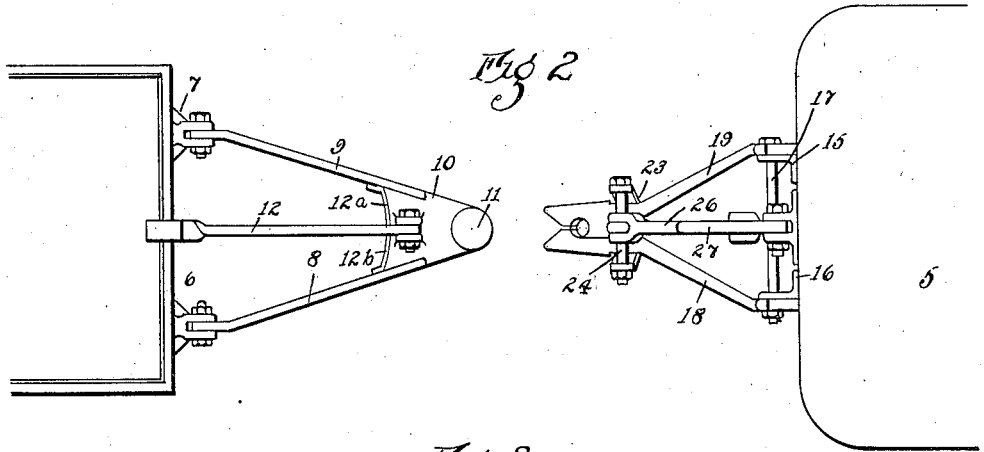
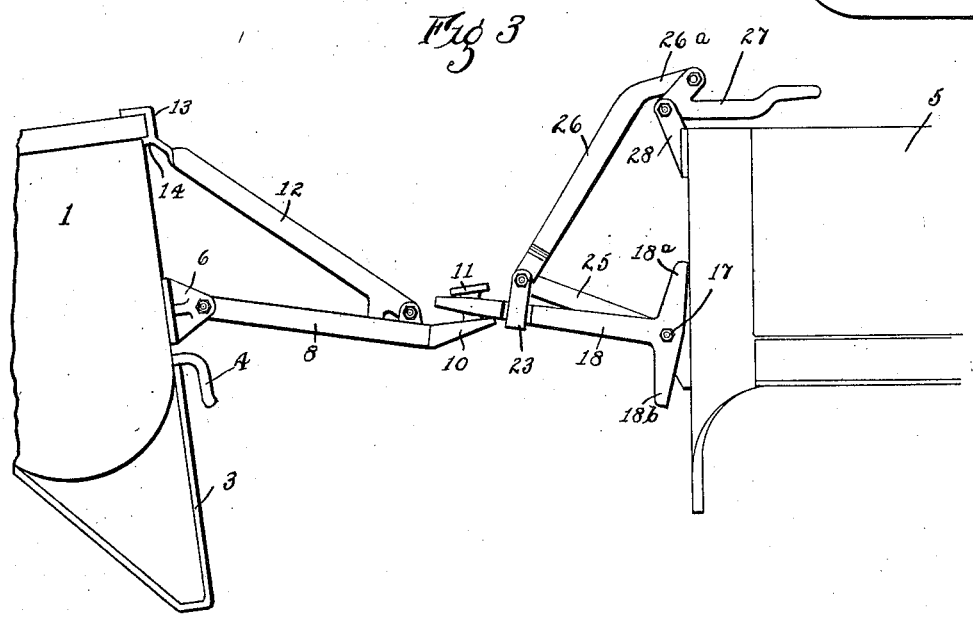
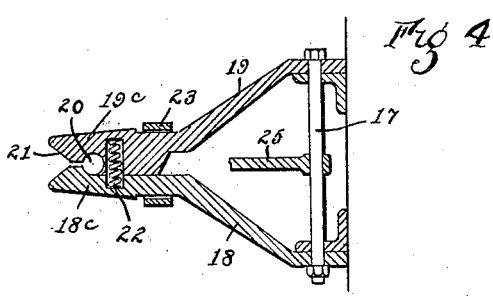
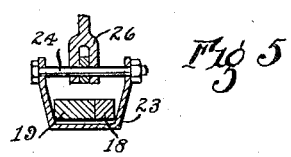
INVENTOR
Carl J. Blass
By Thurston, Kirk & Hudson
ATTYS Patented Apr. 24, 1923.

1,453,059

UNITED STATES PATENT OFFICE.

CARL J. BLASS, OF LAKEWOOD, OHIO, ASSIGNOR TO THE LAKEWOOD ENGINEERING COMPANY, OF LAKEWOOD, OHIO, A CORPORATION OF OHIO.

COUPLING.

Application filed August 4, 1919. Serial No. 315,079.

*To all whom it may concern:*

Be it known that I, CARL J. BLASS, a citizen of the United States, residing at Lakewood, in the county of Cuyahoga and State of Ohio, have invented a certain new and useful Improvement in a Coupling, of which the following is a full, clear, and exact description.

This invention relates to a semi-automatic coupling device whereby a tractor may be coupled to a vehicle.

Specifically, the present embodiment of the invention is more particularly intended to couple a tractor to a two wheeled cart or barrow, the coupling when attached serving not only as a coupler but also elevating the supporting foot or brakes of the barrow to hold it off the ground.

One of the objects of the invention is to provide a coupling construction which automatically functions to produce a locking engagement when the parts of the coupling device are brought together.

A further object of the invention is to provide a construction for that portion of the coupler carried by the barrow such that the coupler parts may be moved out of the way so that the barrow may be moved by hand.

Further objects of the invention will appear more at large as the description proceeds and generally speaking the invention may be said to comprise the elements and the combinations thereof set forth in the accompanying claims.

Reference should be had to the accompanying drawings forming a part of this specification in which Fig. 1 is a side elevation of the coupling device as applied to a tractor and a barrow; Fig. 2 is a top plan view; Fig. 3 is a side elevation showing the coupler parts in engaged position; Fig. 4 is a longitudinal section along the line 4—4 of Fig. 1; Fig. 5 is a sectional elevation through a portion of the coupler. Fig. 6 is a sectional elevation through the member 13.

Referring to the drawings which show a specific embodiment of the coupling arrangement as applied to a tractor and a two wheeled barrow, 1 indicates the body or load containing portion of the barrow, 2 shows one of the two wheels with which the barrow is equipped.

The body 1 is provided with one or more feet indicated at 3, which are adapted to engage with the ground to support the body 1 in upright position. The body 1 is also provided with handles 4, there usually being two such handles so that the barrow may be moved by hand where such is desired.

The tractor which is generally indicated at 5 may be of any desired design or construction and operated by any desired form of motive power.

The front portion of the body 1 carries two brackets 6 and 7. Pivotally mounted in these brackets are arms 8 and 9. These arms converge and are fastened to a head 10. The head is provided with a post 11 which has a flattened head such as indicated at 11$^a$.

Pivotally mounted upon the head 10 is an arm 12. This arm at its opposite end is provided with a hook portion 13 having an underlip 14. The hook portion 13 is adapted to engage with the upper portion of the body 1 and the lip 14 extends under the lower edge of the band 1$^a$ which is secured to the upper portion of the body 1. The hook 13 has a loose engagement with the band 1$^a$ so that by moving the same forward the underlip 14 moves out from beneath the lower portion of the band 1$^a$ whereupon the hook 13 may be removed from the band. Ordinarily when the hook 13 engages the band 1$^a$ any upward movement of the arm 12 is checked by engagement of the underlip 14 with the underside of the band 1$^a$. The arm 12 serves to support the arms 8 and 9 and the head 10 in proper position to be engaged by the other portion of the coupling device which will subsequently be described.

The arm 12 is provided with side extensions 12$^a$ and 12$^b$ which are adapted to engage with the members 8 and 9 thereby positioning the member 12 in a central position.

Upon the tractor there are mounted two brackets 15 and 16, extending between these brackets is a rod 17. Mounted upon the rod 17 are arms 18 and 19. These arms at the portions adjacent the tractor are provided with oppositely extending portions 18$^a$ and 18$^b$. These extensions are for the purpose of limiting the upward or downward movement of the arms 18 and 19 and as will be seen by reference to Fig. 1, the extension 18$^b$ engages with the end of the tractor when the arms 18 and 19 are in their lowermost position.

The arm 18 has a jaw 18ᶜ and the arm 19 has a jaw 19ᶜ. The jaw 19 and the jaw 18 when in closed position co-operates to form an opening 20 which is adapted to receive the pin 11.

The ends of the jaws 18ᶜ and 19ᶜ are beveled as indicated at 21, thereby forming a V-shaped recess when the jaws are together. The walls of this recess 21 guide the pin as the jaws move against the pin during coupling action and exert a wedging action which forces the jaw apart in the event that they are stuck together and do not respond to the expansive action of the spring which is about to be described.

A spring 22 has the opposite ends thereof seated in recesses formed in the jaws 18ᶜ and 19ᶜ and the action of this spring is such as to normally force the jaws apart.

Engaging the levers 18 and 19 just behind the heads thereof is a yoke 23. This yoke extends beneath the arms 18 and 19 and the sides of the yoke are adapted to engage with the sides of the levers 18 and 19. The side members of the yoke are slanting and therefore when the yoke is drawn upwardly with respect to the members 18 and 19 it causes the jaws to close against the action of the spring 22.

The yoke 23 has the opposite upper ends thereof secured to a pin 24.

Pivotally secured to the pin 24 is a lever 25 which extends rearwardly and is pivotally mounted upon the rod 17. This arm 25 holds the yoke 23 in its forward position and properly positioned with respect to the arms 18 and 19.

Also pivotally connected upon the pin 24 is a lever 26. This lever at its opposite end has a bent portion 26ª which is pivoted to a handle 27. The handle 27 is in turn pivoted upon a bracket 28 carried by the tractor 5.

The pivotal point of the link 26 upon the handle 27 is such that when the handle 27 is moved rearwardly thereby to elevate the yoke 23, a line connecting the pivotal point of the link 26 and lever 27 with pivot 24 moves beyond a line connecting the pivotal point of the lever 27 upon the bracket 28 with pivot 24 thereby locking the levers in their adjusted position and holding the yoke in elevated position.

In operation when the coupler parts are disconnected as shown in Fig. 1, the handle 27 is in its forward position and the arms 18 and 19 are in their lowermost position. The tractor is moved backward until the post 11 enters the V-shaped notch 21 in the ends of the heads 18ᶜ and 19ᶜ. This engagement exerts a cam action on the jaws 18ᶜ and 19ᶜ causing them to move up the side members of the yoke 23 and with the assistance of the spring 22 and because of the fact that due to their length the arms 18 and 19 have some inherent elasticity and further because they are provided with a rather loose fit at their pivotal mountings, the jaws open a sufficient amount to permit the post 11 to enter the opening 20. As soon as the pin enters the opening 20 there is a tendency for the levers 18 and 19 to drop with respect to the yoke 23 thereby causing the jaws to close around the post 11.

The lever 27 is thereupon moved to the position shown in Fig. 3 which elevates the members 18 and 19 and incidently raises the head 10 which is connected with the barrow.

This lifts the foot 3 from the ground thereby permitting the barrow to be drawn by the tractor and furthermore the downward pull exerted by the head of the pin 11 upon the jaws 18ᶜ and 19ᶜ holds these jaws down in the yoke 23 which in turn insures that the jaws will not spread open.

When it is desired to release the barrow the lever 27 is moved forward to a position which permits the foot 3 to rest upon the ground and also lowers the yoke 23 sufficiently so that the spring 22 may open the jaws 18ᶜ and 19ᶜ thereby releasing the post 11.

It will be noted that the post 11 may be approached by the jaws 18ᶜ and 19ᶜ from almost any position, and it is not necessary that the tractor and the barrow be in alignment.

Furthermore, attention is called to the fact that if it be desired to use the barrow as a hand barrow, the arm 12 may be unhooked from its engagement with the top of the barrow allowing the arm 12 to extend inside of the body if the same is empty or causing it to lie on top of the load, if there be a load in the body, whereupon the arms 8 may be moved to a vertical position, thus affording opportunity for an operator to grasp the handles 4 to tilt the barrow so that it may be moved.

Having described my invention, I claim—

1. A coupling device comprising two co-operating parts, one of said parts including an upstanding post, the other of said parts comprising a pair of jaws, said jaws being mounted to permit relative movement toward and from each other and movement as a unit about a pivot, means co-operating with said jaws for moving them together, and also for moving said jaws about said pivot.

2. A coupling device comprising two co-operating parts, one of said parts including an upstanding post, the other of said parts comprising a pair of jaws, said jaws being mounted to permit relative movement toward and from each other and movement as a unit, a yoke having slanting sides engaging said jaws and means for moving said yoke.

3. A coupling device comprising two cooperating parts, one of said parts including an upstanding post, the other of said parts comprising a pair of pivoted arms, each of said arms having oppositely disposed jaws at one of its ends and a yoke having slanting sides which cooperate with the said arms and adapted to move the jaws to closed position and to move the said arms about the pivotal point.

4. A coupling device comprising two cooperating parts, one of said parts including an upstanding post, the other of said parts comprising a pair of pivoted arms, means carried by said arms for limiting the movement thereof about their pivots, jaws carried by the said arms, a yoke having slanting sides engaging the said arms, means for moving the yoke.

5. A coupling device comprising two cooperating parts, one of the parts including an upstanding post, the other of said parts comprising a pair of pivoted arms, jaws carried at the outer ends of said arms, a yoke member having slanting sides engaging said arms adjacent the jaws, a lever pivoted to said yoke, a handle which is pivotally mounted, said lever being pivotally mounted upon the handle, a line connecting the pivotal points of the lever upon the yoke and the handle passing below the pivotal point of the handle when the handle is moved to its furtherest position in elevating the yoke.

6. A coupling device comprising two cooperating parts, one of said parts comprising an upstanding post, a pivoted support for said post, a brace arm pivotally mounted upon the said support and having a securing means at the other end thereof, the other part of said coupling device having means which cooperate with said post and means for elevating the said other part of the coupling device thereby elevating the said post and parts associated therewith.

7. A coupling device comprising two cooperating parts, one of said parts comprising a head member, an upstanding post carried by said head member, diverging arms secured to said head member, said arms being adapted for pivotal mounting, a brace member pivoted to the said head and having connection means at its opposite end, the other part of said coupling device including a pair of movable jaws which cooperate with said post and means for elevating the said other part of the coupling device thereby elevating said post and parts associated therewith.

8. A coupling device comprising two cooperating parts, one of said parts comprising a head, an upstanding post carried by the head, diverging arms secured to the head, said arms being adapted for pivotal mounting, a brace member pivotally mounted upon the head and provided with connecting means at its opposite end and bracing arms carried by said brace member adapted to engage with the said diverging arms, the other part of said coupling device including means to cooperate with said upstanding post, and means for elevating the said other part of the coupling device thereby elevating the said post and parts associated therewith.

In testimony whereof, I hereunto affix my signature.

CARL J. BLASS.